Feb. 21, 1967  M. E. BERGY ETAL  3,305,554
STREPTOVITACINS

Filed Sept. 20, 1965  13 Sheets-Sheet 1

MALCOLM E. BERGY
THOMAS E. EBLE
JOHN S. EVANS
ROSS R. HERR
ROBERT W. HEINLE
CHARLES M. LARGE
WALTER T. SOKOLSKI
*INVENTORS*

BY EUGENE O. RETTER
GEORGE T. JOHANNESEN
*ATTORNEYS*

ROTATORY OPTICAL DISPERSION

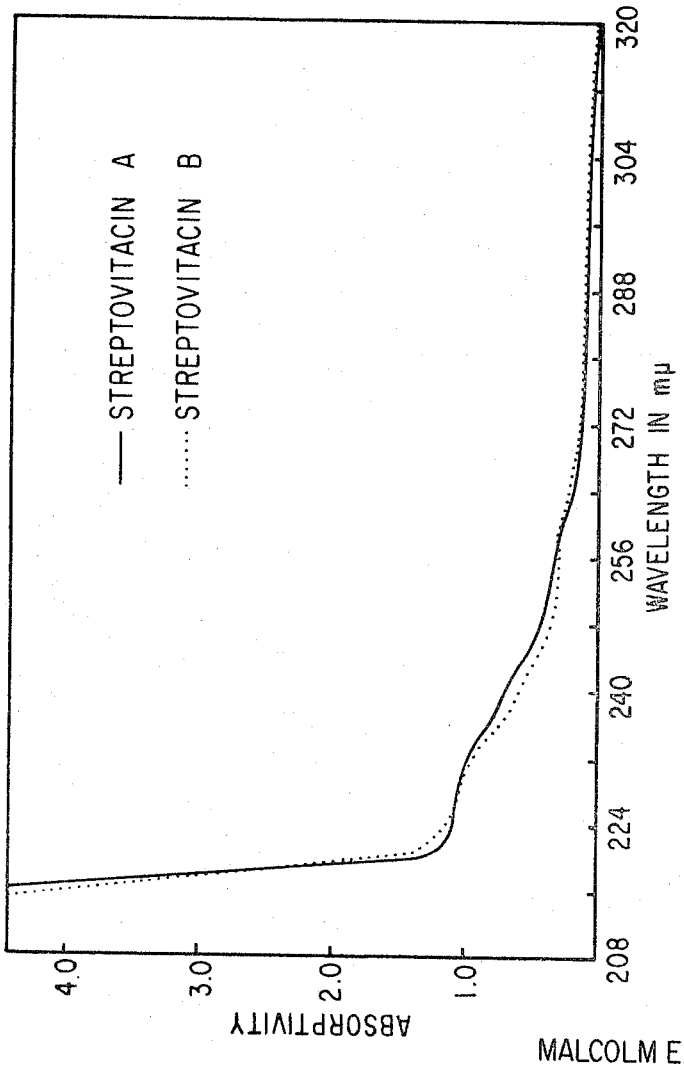

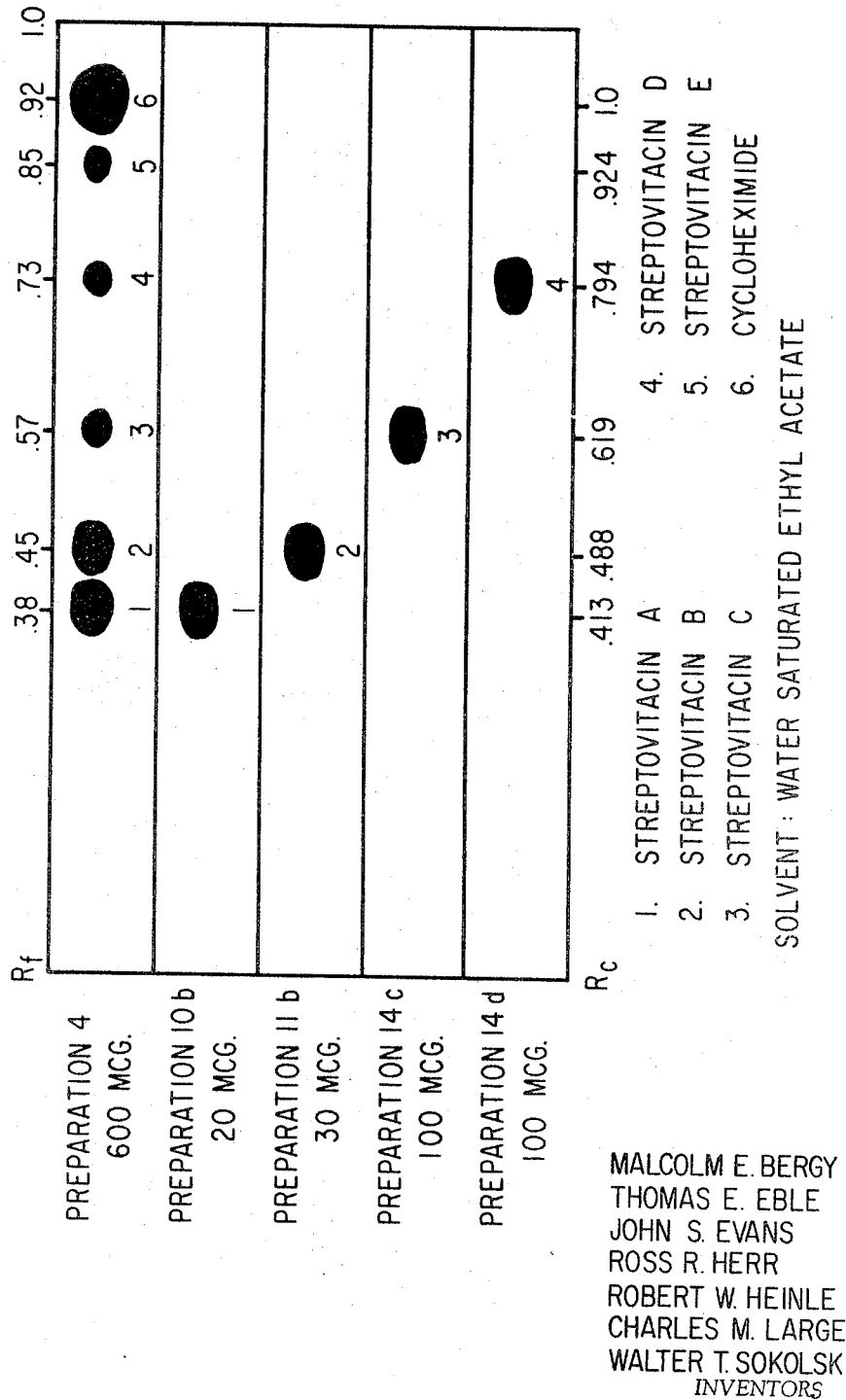

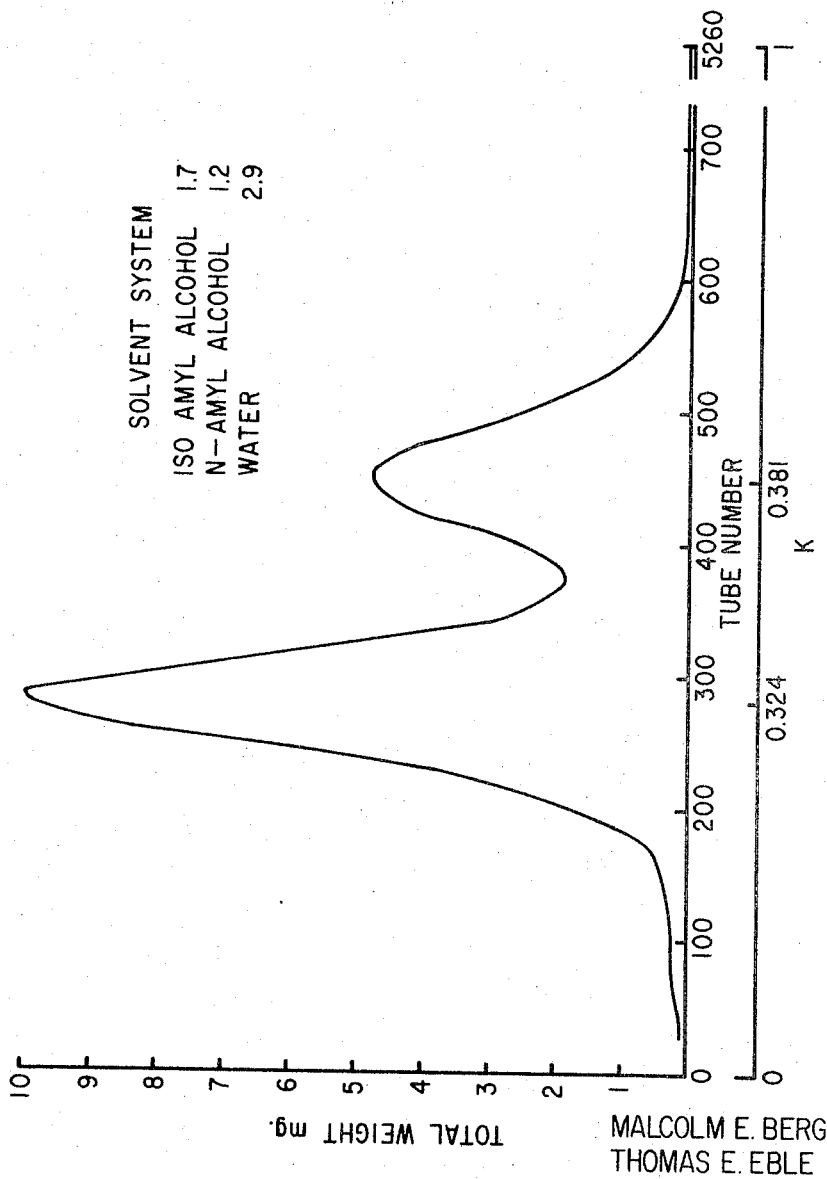

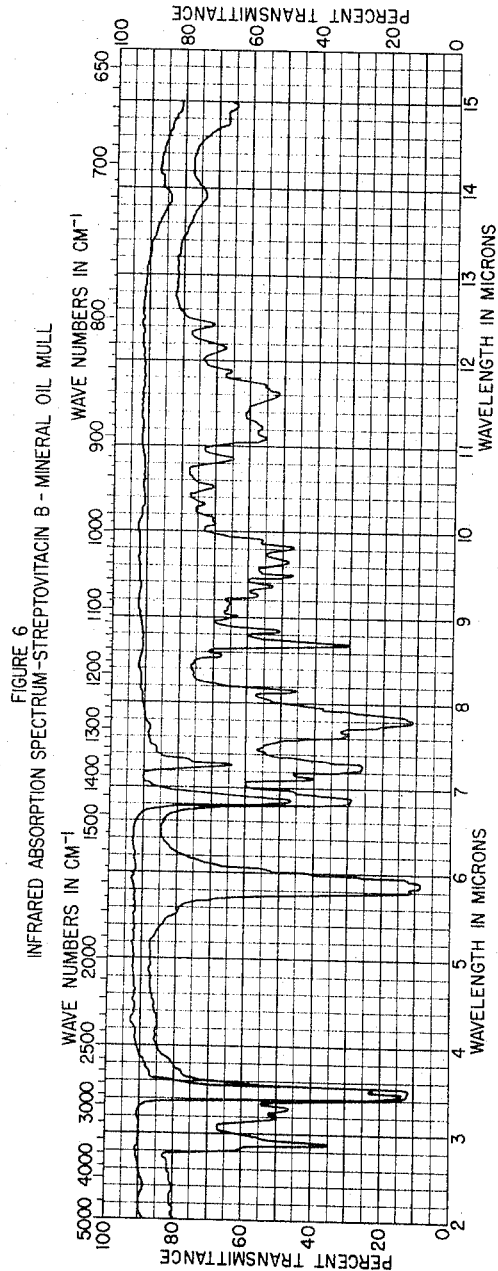

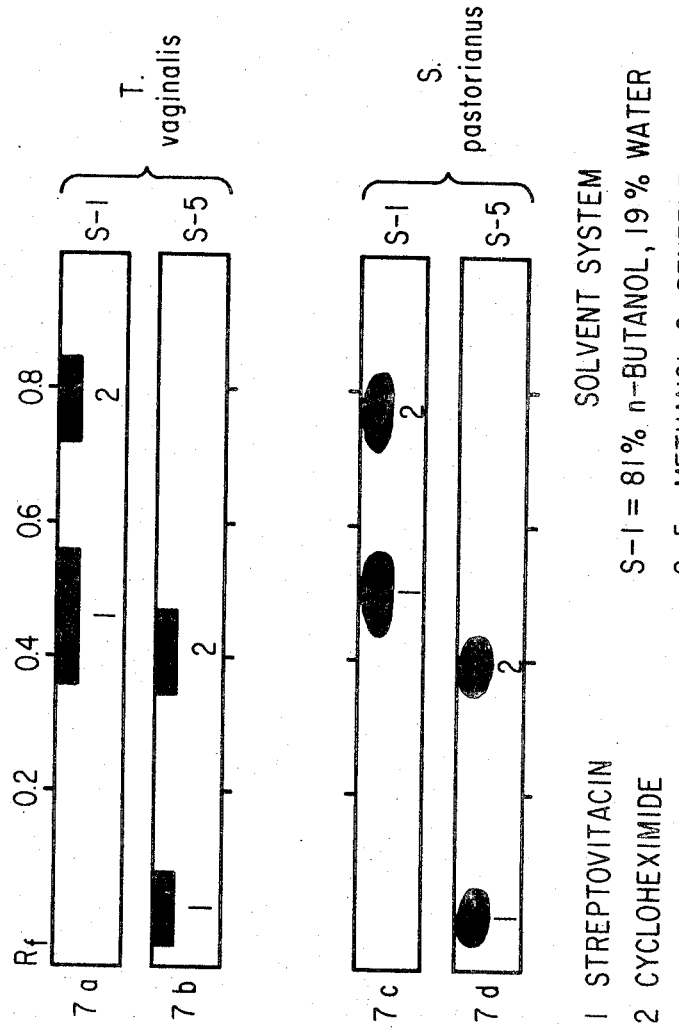

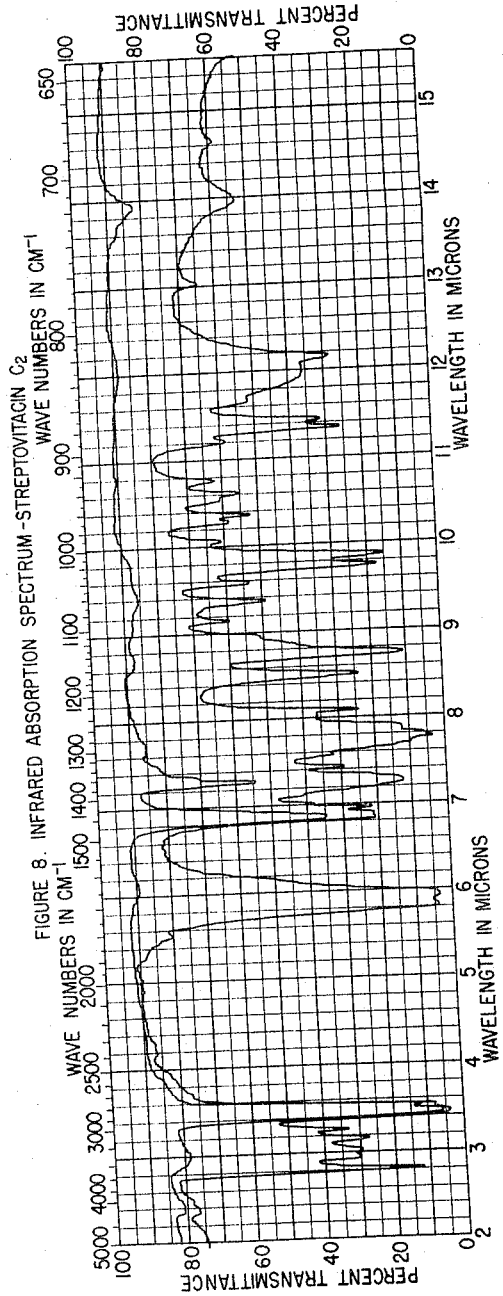

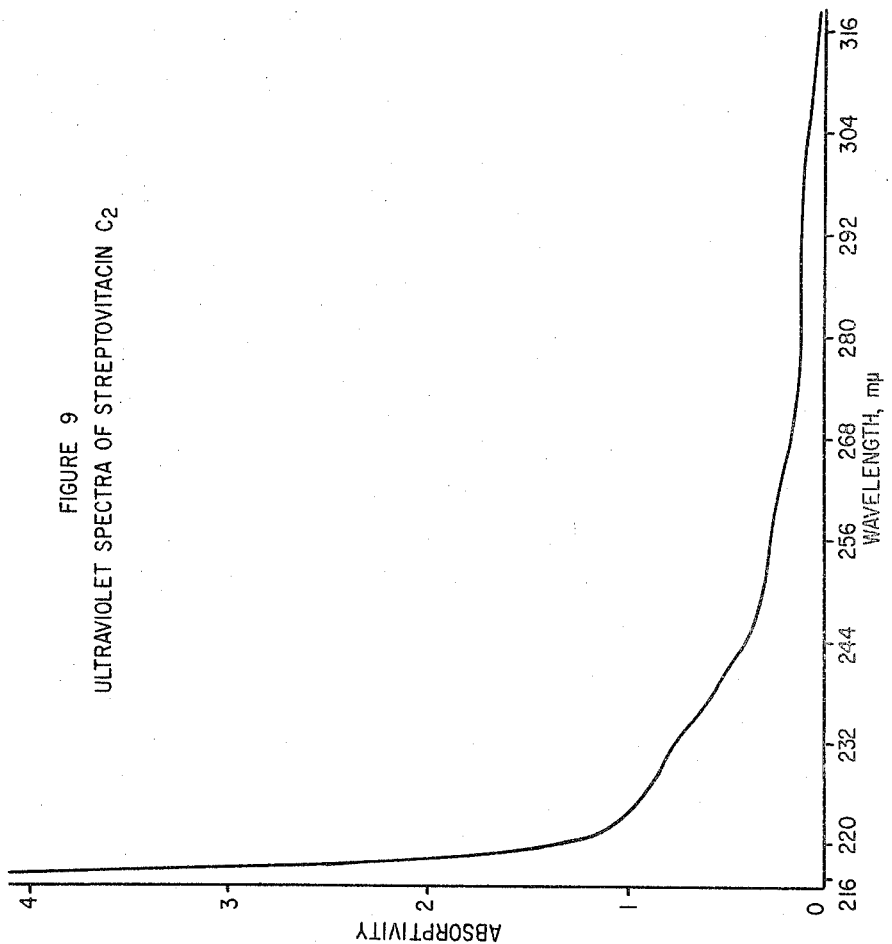

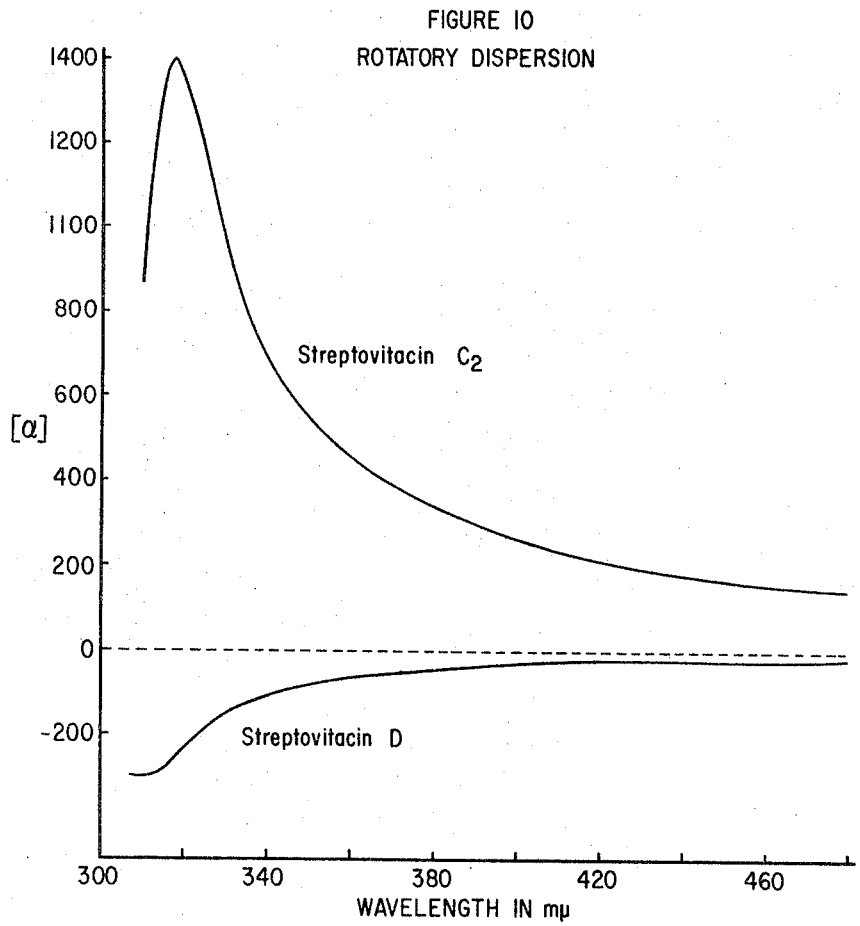

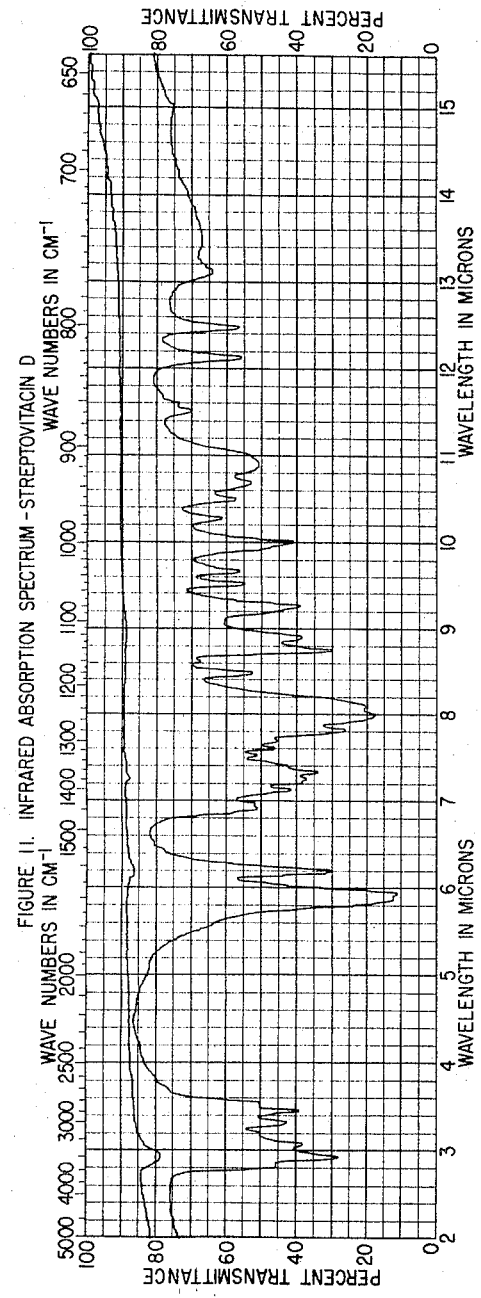
MALCOLM E. BERGY
THOMAS E. EBLE
JOHN S. EVANS
ROSS R. HERR
ROBERT W. HEINLE
CHARLES M. LARGE
WALTER T. SOKOLSKI
*INVENTORS*
BY EUGENE O. RETTER
GEORGE T. JOHANNESEN
*ATTORNEYS*

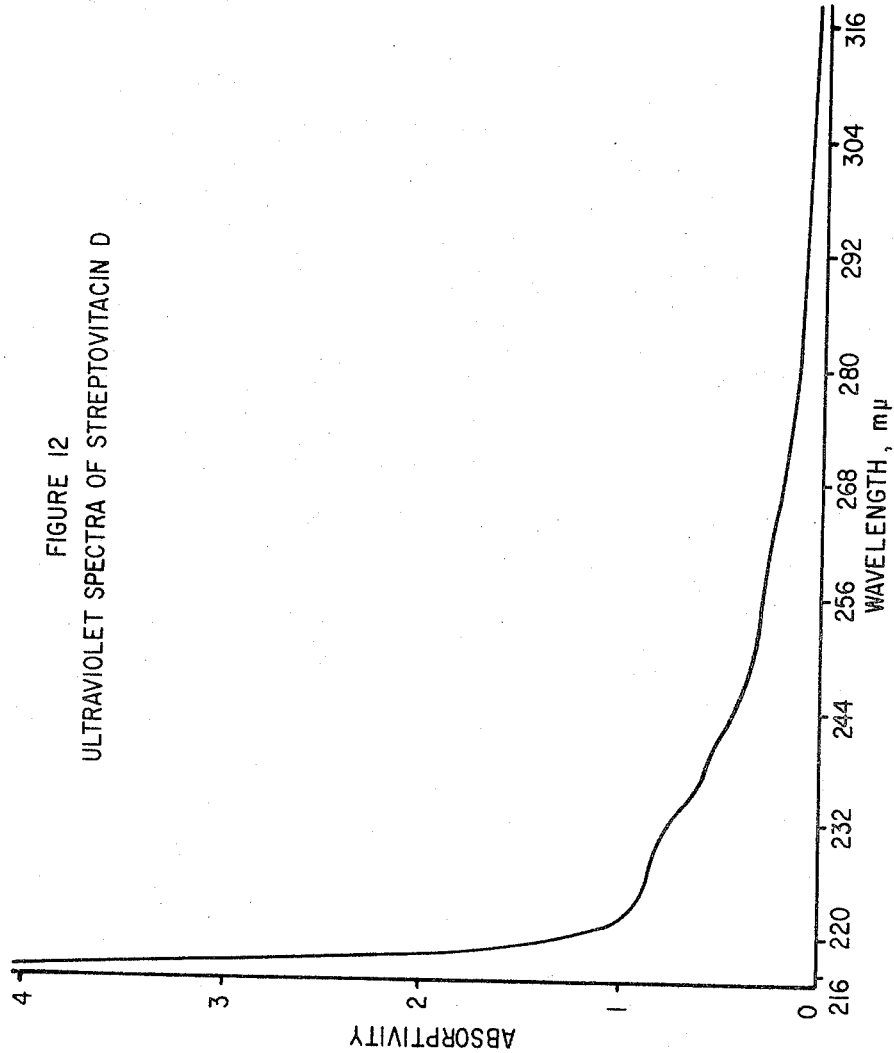

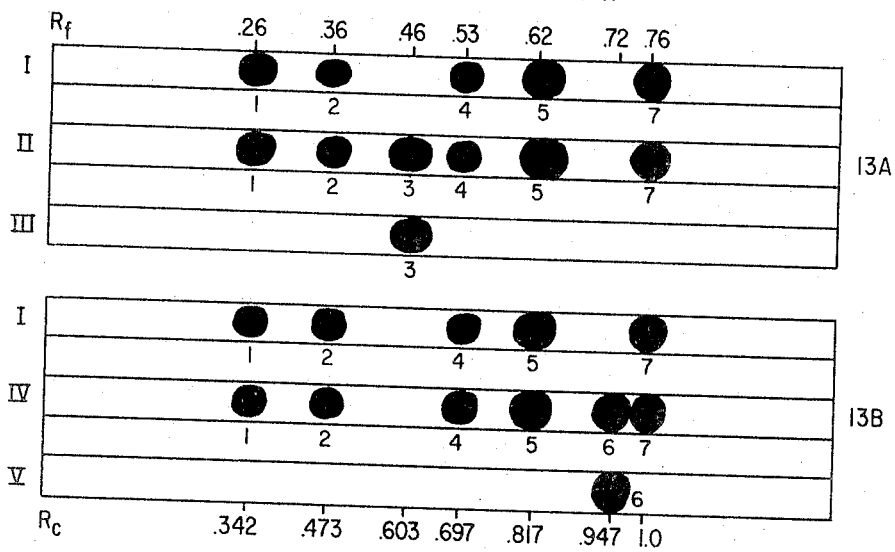

3,305,554
STREPTOVITACINS
Malcolm E. Bergy, Thomas E. Eble, John S. Evans, Ross R. Herr, Robert W. Heinle, and Charles M. Large, all of Kalamazoo, and Walter T. Sokolski, Kalamazoo Township, Kalamazoo County, Mich., assignors to The Upjohn Company, Kalamazoo, Mich., a corporation of Delaware
Filed Sept. 20, 1965, Ser. No. 492,982
18 Claims. (Cl. 260—281)

This application is a continuation-in-part of the pending application of Malcolm E. Bergy et al., Serial No. 773,999, filed in the U.S. Patent Office on November 14, 1958, now abandoned. Application Serial No. 773,999 is a continuation-in-part of the application of Malcolm E. Bergy et al., Serial No. 730,647, filed April 24, 1958, now abandoned.

This invention relates to a new composition of matter and is particularly concerned with a novel biosynthetic toxicant, and with a method for the separation and isolation of the new biosynthetic from a fermentation medium containing the same. More particularly, the invention relates to 3-[2-(x-hydroxy-3,5-dimethyl-2-oxocyclohexyl) - 2 - hydroxyethyl] - glutarimide, hereinafter designated streptovitacin, which has the structural formula:

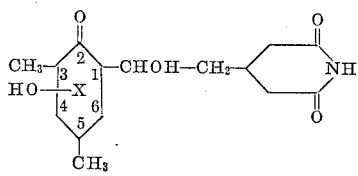

(I)

and with a method of recovering the same either as a complex of two or more isomers or as separate isomers, as desired.

It is known that antibiotics can be obtained from culturing *Streptomyces griseus* in a nutrient medium, for example, one which comprises glucose, meat extract, peptone, and sodium chloride. Certain strains of *S. griseus* produce cycloheximide and streptomycin, cycloheximide being obtained in high yield when the fermentation is carried out at a low temperature, i.e., at about 22–26 degrees centigrade, and streptomycin being obtained in high yield when the fermentation is carried out at a relatively high temperature, i.e., about 28–32 degrees centigrade.

It has now been found that the organisms thatt elaborate cycloheximide and streptomycin, also elaborate the material, herein designated as streptovitacin, which heretofore has been unknown, unrecognized, and unused. Until our discovery, the customary and usual procedures for the isolation of streptomycin and cycloheximide from culture broth containing the same have destroyed, or prevented the isolation and recognition of streptovitacin. In working up such broths, the streptomycin and cycloheximide were isolated, and the residues were discarded. Hence even though streptovitacin was formed as a concomitant to cycloheximide, it was not known, recognized, or recovered in a usable and recognizable form prior to this invention. By the process of this invention we are now able to isolate, separate, and recover streptovitacin either as a mixture or two or more isomers or as separate isomers, free of streptomycin and cycloheximide and like concomitants.

The biosynthetic of this invention comprises a group of chemically, physically, and biologically similar isomers, streptovitacins A, B, $C_1$, $C_2$, D, and E, each of which has the structural formula I. These isomers, either as a complex of two or more of the isomers or as individual isomers, can be separated and isolated by paper chromatography, countercurrent distribution, partition chromatography, and like procedures as more particularly described hereinafter. The complex is characterized in that the components, streptovitacin A, B, C ($C_1$ and $C_2$), D, and E, have a paper strip mobility as shown in FIGURES 4 and 13 and a Craig mobility as shown in FIGURE 5; are active against *Trichomonas vaginalis* and *Saccharomyces pastorianus*, and are highly toxic to rodents and to foliage plants. On alkaline hydrolysis, the complex yields a mixture of 2,4-dimethyl-2-cyclohexenone and a 2,4-dimethyl - x - hydroxycyclohexanone. The formation of 2,4-dimethyl-2-cyclohexenone is characteristic of streptovitacin B and indicates that the hydroxyl is in the 4-position. Streptovitacin B therefore, has the following formula:

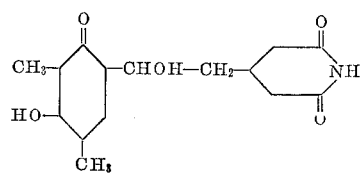

(II)

and the chemical name, 3[2-(4-hydroxy-3,5-dimethyl-2-oxycyclohexyl) - 2 - hydroxyethyl]-glutarimide. Streptovitacin A yields predominately said 2,4-dimethyl-x-hydroxycyclohexanone, indicating that in this isomer the hydroxyl group is not in the 4-position.

Streptovitacin A crystallizes in monoclinic and orthorhombic, optically negative crystals which have the characteristic ultraviolet spectrum, infrared absorption spectrum, and rotatory dispersion as shown in the drawings, and has the hydroxyl group in the 5-position, as in the structural formula:

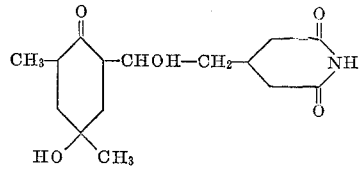

(III)

and the chemical name, 3-[2-(5-hydroxy-3,5-dimethyl-2-oxocyclohexyl)-2-hydroxyethyl]-glutarimide.

The analytical data, analyses, rotary dispersion curves, infrared and ultraviolet spectra, mobility, etc. show that streptovitacins B, $C_1$, $C_2$, D and E are isomers of streptovitacin A, either position isomers or stereoisomers as represented by Formula I. They can be differentiated from each other and from streptovitacin A and cycloheximide by their relative mobilities as shown in FIGURE 13.

In the following drawings:

FIGURE 3 shows the ultraviolet spectrum of streptovitacins A and B.

FIGURE 4 shows a chromatographed papergram of a typical cycloheximide beer which demonstrates the relative mobilities of streptovitacins A, B, C, D, and E and cycloheximide with reference to the solvent front, $R_f$, and with reference to the mobility of cycleximide $R_c$, the solvent system being water saturated ethyl acetate.

FIGURE 5 shows the result of countercurrent distribution after 5260 transfers, the solvent system being 1-pentanol:3-methylbutanol:water of the volume proportions 1.7:1.2:2.9, which demonstrates the relative mobilities of streptovitacin A and streptovitacin B as K=0.324 and K=0.381, respectively.

FIGURE 6 shows the infrared absorption spectrum of streptovitacin B.

FIGURE 7 shows the separation of streptovitacin from cycloheximide by paper partition chromatography.

FIGURE 8 shows the infrared absorption spectrum of streptovitacin $C_2$.

FIGURE 9 shows the ultraviolet absorption spectrum of streptovitacin $C_2$.

FIGURE 10 shows the rotatory dispersion curves of streptovitacins $C_2$ and D.

FIGURE 11 shows the infrared absorption spectrum of streptovitacin D.

FIGURE 12 shows the ultraviolet absorption spectrum of streptovitacin D.

FIGURE 13 shows the mobility of streptovitacins $C_1$ and E relative to streptovitacins A, B, $C_2$, and D, and cycloheximide, on papergrams.

Figure 1:
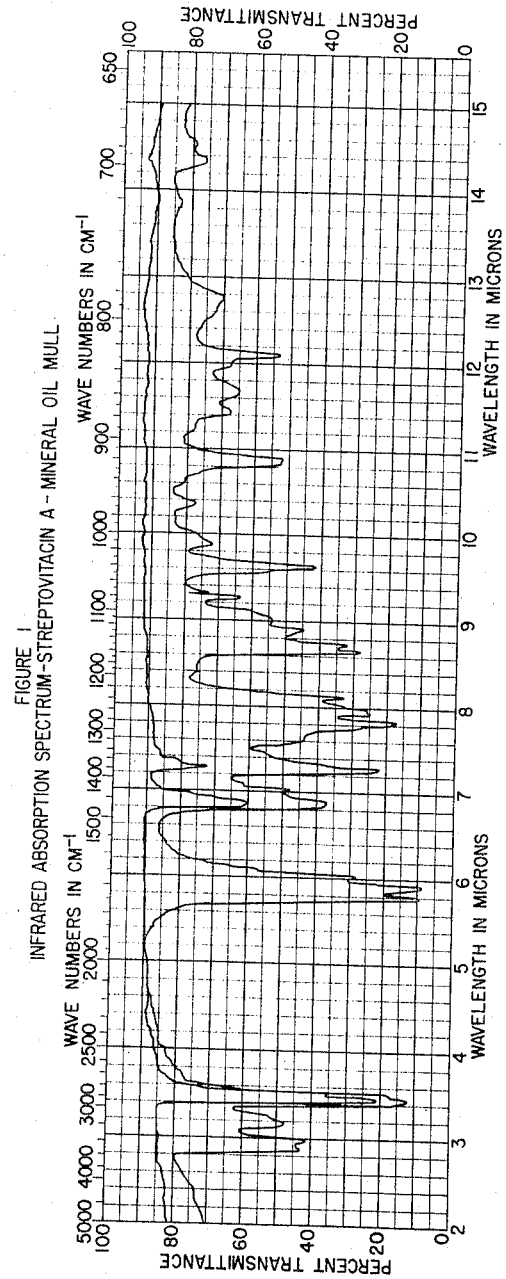
FIGURE 1 shows the infrared absorption spectrum of streptovitacin A.

Streptovitacin is obtained as a crude product from the beer of a cycloheximide fermentation in which the production of streptomycin advantageously has been suppressed by choice of organism, medium, and/or temperature for the fermentation, by extracting the cycloheximide, and then freeze drying the spent beer to a solid material. The crude streptovitacin thus obtained (Preparation 1) contains, by the WAC assay method (see infra), about one WAC unit of streptovitacin per milligram plus substantial amounts of cycloheximide and streptomycin.

A purification of the spent beer solids is obtained by dissolving an aliquot of Preparation 1 in water and then precipitating some concomitant materials by adding an organic solvent like acetone in which streptovitacin is soluble. The precipitate is removed by filtration. The supernatant which contains the bulk of the streptovitacin is freeze dried to yield a product (Preparation 2) approximately five times as concentrated in streptovitacin as the spent beer solids, Preparation 1.

Still further purification is obtained by preferential adsorption and desorption. The crude material, Preparation 2, is dissolved in water and treated with a surface active adsorbent, such as activated carbon. Suitably about 0.1 percent to about three percent (may be as high as 100 percent), and preferably about 1.5 percent of an adsorbent is used. The mixture is slurried, the adsorbent is filtered off, and the streptovitacin is eluted from the adsorbent by a neutral aqueous solution of an organic solvent, such as acetone, in which streptovitacin is soluble. The concentration of the aqueous solution suitably can range from about twenty percent to about 95 percent, and preferably 85 percent acetone. The aqueous solution of streptovitacin so obtained is evaporated under reduced pressures and then freeze dried to yield a product (Preparation 3) which is about fifteen times as concentrated in streptovitacin as the spent beer solids, Preparation 1, and which contains little if any cycloheximide and streptomycin.

The material thus produced, Preparation 3, is further purified by selective precipitation. An aliquot of Preparation 3 is lixiviated in an organic solvent, such as a lower alkanol like methanol, in which streptovitacin is soluble. The supernatant is added to another organic solvent, such as methyl ethyl ketone (MEK), which is a solvent for streptovitacin but which will precipitate concomitant materials. The mixture is filtered, the bulk of the streptovitacin being retained in the supernatant. The supernatant is stripped of the solvents, methanol and MEK by azeotropic distillation, water being added as required to distill off the solvents. The aqueous solution thus obtained is concentrated under reduced pressure and then freeze dried to yield a product (Preparation 4) which is about thirty to fifty times as concentrated in streptovitacin as the spent beer solids, Prepaartion 1, and is essentially free of any cycloheximide or streptomycin.

As an alternative to freeze drying, the aqueous concentrate of the methanol-MEK supernatant, is further processed by gradient chromatography, in which the aqueous concentrate is passed through a column of surface active adsorbent and the column is gradiently eluted with a neutral aqueous solution of a polar solvent, graded from zero percent solvent up to as much as fifty percent or more. Suitable surface active adsorbents include adsorbent carbon such as charcoal and activated carbon; inorganic adsorbents such as active alumina, silica, and clays; and adsorbent resins such as Dow Retardion resin, a polymerized acrylic acid in Dowex 1 as a snake cage; Dowex 1 resin, a porous basically anionic resin containing functional quaternary ammonium groups attached to a styrene-divinylbenzene copolymer; and Permutit DR resin (U.S. 2,702,263), a porous anionic decolorizing resin with weak anionic exchange properties for strong acids. The adsorbents can also be used in place of the activated carbon in the preferential adsorption and desorption described above. Suitable polar solvents include the water-soluble lower alkanols and alkanones such as methanol, ethanol, propanol, isopropanol, 2-methyl-2-butanol, 2-propanone (acetone), and 2-butanone (MEK). These solvents also can be used in lieu of the acetone in preferential adsorption and desorption described above.

In some instances it is desirable to pass the spent beer from the cycloheximide extraction directly to the gradient chromatographic column. This is especially effective when Permutit DR is used as the adsorbent.

The crude streptovitacin can be further purified by selective adsorption of concomitant material. This is accomplished by dissolving the crude material, or extracting it, with an organic solvent, and treating the resulting solution with a surface active adsorbent. For example, the product (Preparation 5) of the above described gradient chromatography is lixiviated with water and filtered, then the streptovitacin contained in the supernatant is extracted with MEK, the extract being passed through activated carbon to remove concomitant material after which the extract is stripped of solvent by azeotropic distillation and concentrated to an oil (Preparation 6) which on standing may crystallize to form crystals of streptovitacin A (Prepaartion 7) 350 times as concentrated in streptovitacin as Preparation 1. If crystals do not form or if further purification is desired, the material is purified further by partition chromatography, or countercurrent distribution. Other crude products such as Preparation 5 for example can also be further purified by these processes.

Further purification of streptovitacin crudes by partition chromatography is effected by using a column packed with silica, cellulose, or like inert, finely divided material and a solvent system consisting of fifteen to fifty percent water-immiscible organic solvent, and up to 35 percent water-miscible organic solvent; said system containing from forty to 75 percent polar organic solvent selected from the group consisting of lower saturated aliphatic alcohols, ketones, and carboxylic acid esters; and containing up to 25 percent hydrocarbon solvents. Suitable solvent mixtures include the following table:

TABLE I

| Solvent mixture:* | Proportions, respectively, v./v. |
|---|---|
| 1-propanol:water:benzene | 5:5:2 |
| 1-propanol:water:cyclohexane | 6:5:2 |
| 1-pentanol:water | 1:1 |
| 1-pentanol:3-methyl butanol:water | 1.7:1.2:2.9 |
| 1-butanol:methyl ethyl ketone:water | 1:1:2 |
| Ethyl acetate:water | 1:1 |
| Ethyl acetate:water (pH 5) | 1:1 |
| Ethyl acetate:cyclohexane:ethanol:water | 8:6:8:4 |
| Ethyl acetate:cyclohexane:ethanol:water | 8:4:8:4 |
| Ethyl acetate:cyclohexane:ethanol:water | 8:5:8:4 |
| Ethyl acetate:cyclohexane:water (pH 5) | 7:1:8 |
| Ethyl acetate:cyclohexane:water (pH 5) | 7:4:8 |
| Ethyl acetate:cyclohexane:water (pH 5) | 3:7:1 |
| Ethyl acetate:cyclohexane:water (pH 5) | 6:2:8 |
| Ethyl acetate:cyclohexane:water (pH 5) | 4:4:8 |
| Ethyl acetate:cyclohexane:water (pH 5) | 5:3:8 |

* Where pH is not specified tap water which has a pH of about six is used. Where pH is specified, pH is adjusted as indicated with a phosphate buffer, or like buffer.

A preferred solvent system is ethyl acetate:cyclohexane: ethanol:and water, in the proportions 8:6:8:4. When the solvent mixture is allowed to stand, it separates into an upper phase and a lower phase which are used separately in preparing and developing the column. The column is a poured or tamped, air pressure packed column wet with lower-phase. To the top of the column is added a slurry of diatomite in a solution of the streptovitacin crude in a mixture of upper phase and a small amount of the lower phase. The column is then eluated with the upper phase, the eluate being taken off in fractions and analyzed for solids content and assay value. The streptovitacin rich fractions are pooled, stripped of solvent, and dried. By this process a crude streptovitacin, e.g., Preparation 5, is upgraded more than two fold to a product (Preparation 8$b$) assaying about 300 times as concentrated in streptivitacin as the spent beer solids, Preparation 1.

Crude streptovitacin, such as Preparation 8$b$, can be further purified by dissolving it in a lower alkanol, such as 1-butanol and adding an organic solvent in which streptovitacin is only slightly soluble, such as ether, or a hydrocarbon like cyclohexane. The crystalline material obtained on filtering and drying (Preparation 9) is about 375 to about 400 times as concentrated in streptovitacin as the spent beer solids, Preparation 1. From the mother liquor of the crystallization supra can be obtained streptovitacins B, $C_1$, $C_2$, and D by partition chromatography.

On recrystallization from 1-butanol or the like lower alkanol, by dissolving in butanol and adding ether or cyclohexane to a 1-butanol solution, and further recrystallizations in the same way or directly from other solvents such as acetonitrile and ethyl acetate essentially pure crystalline streptocitacin A (Preparation 10) is obtained which is about 450 to about 500 times as concentrated in streptovitacin as the spent beer solids, Preparation 1.

Streptovitacin A crystallizes in two crystal forms, I and II. Crystal form I is usually formed at elevated temperature. Crystal form II is usually formed at low temperature. Form I can be transformed to form II by X-irradiation, or by heating to about 150 degrees centigrade. The crystalline forms I and II of streptovitacin A are similar to one another, the essential difference being that form I is orthorhombic, and form II is monoclinic.

Recovery of streptovitacin from the cycloheximide spent beer can also be accomplished by purifying with carbon, concentrating by partition chromatography, and then crystallizing; by purifying and concentrating by gradient chromatography, by partition chromatography, and then crystallizing; by extracting with a suitable organic solvent, precipitating concomitant material, and then crystallizing; and the like.

Streptovitacin crudes can also be separated and isolated from normal concomitant materials, and separated into component isomers by the use of countercurrent distribution using the same solvent systems that are described and exemplified above for partition chromatography. By the use of this method, and the solvent system 1-pentanol:3-methyl butanol:water, in the porportions 1.7:1.2:2.9, for the isolation and extraction, two peaks are found wherein the K values are in the order of 0.3 to 0.32 and 0.36 to 0.38 for the streptovitacin A and streptovitacin B, respectively, the K value being defined as follows: $K = n/T - n$ wherein $n$ is the number of the tube containing the peak weight and T is the total number of transfers.

Streptovitacin A crystallizes spontaneously as an essentially pure material (Preparation 11$a$) assaying 420 to 500 times as concentrated in streptovitacin as the spent beer solids, Preparation 1, by the WAC assay, from the pool of fractions of the first peak, in the ranges K=0.3 to 0.32. Streptovitacin B is obtained from the second peak, in the ranges K=0.36 to 0.38, by freeze drying to an amorphous solid material (Preparation 11$b$), the preparation assaying about 100 to about 150 times as concentrated in streptovitacin as the spent beer solids, Preparation 1, by the WAC assay, and about 75 times as concentrated in streptovitacin as the spent beer solid by an assay method based on the ascites form of Ehrlich's carcinoma. Streptovitacin B can also be obtained crystalline (Preparation 18).

Crude streptovitacin can also be separated from normal concomitant material, and separated into component isomers by the use of paper strip partition chromatography. Aliquots of beer, crude, or concentrate of streptovitacin are spotted on paper strips, pretreated with a buffer solution and dried as more particularly set forth below. Mobility is induced by using a suitable solvent system such as water saturated ethyl acetate. The location of the spots of the streptovitacin isomers are most suitably determined by plating out the paper strips on agar plates which have been seeded with *Saccharomyces pastorianus*, the growth of which is inhibited by the streptovitacin isomers and cycloheximide.

FIGURES 4 and 13 illustrate typical applications of paper strip chromatography to the separation, isolation, and identification of the streptovitacin isomers. FIGURE 4 shows the method applied to a crude preparation and to specific isolates containing essentially only streptovitacins A, B, C, and D, C being in reality a mixture of two components which in the presence of concomitant impurities moves as a single spot, but which when further refined move as separate spots as shown in FIGURE 13.

FIGURE 13 illustrates the application of the method to identification and differentiation among the streptovitacin isomers. For this purpose the paper strip is spotted with three materials, namely, (1) the unknown, in this case a mixture of Preparations 19$b$ and/or 15$c$; (2) a mixture of knowns, in this case a mixture of Preparations 10$b$, 18$d$, 19$e$, and 20$b$; and (3) a mixture of the knowns and the unknown. The developing solvent is water-saturated ethyl acetate. It will be observed in FIGURE 13A that, in this solvent system, streptovitacin $C_1$ as Preparation 19$b$, moves a little slower than streptovitacin $C_2$ and somewhat faster than streptovitacin B, and in FIGURE 13B that streptovitacin E, as Preparation 15$c$, moves a little slower than cycloheximide and somewhat faster than streptovitacin D. These relative mobilities clearly identify the unknown isomers in relation to the known ones and establish the following order of increasing mobility: $A < B < C_1 < C_2 < D < E <$ cycloheximide. Thus, what streptovitacin isomer is contained in a preparation, or when a preparation contains concomitant material which tends to obscure the results obtainable by other methods of identification such as UV and IR absorption, elemental analysis, and the like, identification can be made simply and effectively by noting how the unknown isomer moves in relation to the known isomers and cycloheximide in the water-saturated ethyl acetate system.

While the relative movement of the component isomers may vary somewhat, depending upon the time and conditions involved in the development of the paper strip, a definite order is always obtained, as noted above and as shown in the following table:

TABLE II.—MOBILITY OF STREPTOVITACIN ISOMERS RELATIVE TO CYCLOHEXIMIDE IN WATER-SOLUBLE ETHYL ACETATE

|  | $R_c$ | | Percent of cycloheximide |
|---|---|---|---|
|  | Fig. 4 | Fig. 13 |  |
| Streptovitacin A | 0.41 | 0.34 | 35–40 |
| Streptovitacin B | 0.49 | 0.47 | 50 |
| Streptovitacin $C_1$ | 0.61 | 0.60 | 60 |
| Streptovitacin $C_2$ |  | 0.70 | 70 |
| Streptovitacin D | 0.79 | 0.82 | 80 |
| Streptovitacin E | 0.92 | 0.95 | 93 |
| Cycloheximide | 1.00 | 1.00 | 100 |

The process, as above outlined, can also be utilized for isolating particular isomers. Thus, isolation and separation of the streptovitacin isomers can be effected by eluting, with a solvent for streptovitacin, portions of the paper strip which contain only the desired isolate and recovering the isolate therefrom.

Partition chromatography can also be used to separate streptovitacin isomers from each other and from other concomitant materials by using a nonreactant filler, such as diatomite, and a mixed solvent system such as ethyl acetate, cyclohexane, and buffered water.

In a preferred embodiment of this invention, *Streptomyces griseus* is fermented under conditions most suitable for the production of cycloheximide. The whole beer is heated to about fifty degrees centigrade to about seventy degrees centigrade, preferably to about sixty degrees centigrade, adjusted to about pH two to about pH four, preferably to about pH three to about pH 3.5, then cooled to about twenty degrees centigrade to about forty degrees centigrade, preferably to about thirty degrees centigrade, and then filtered to remove the mycelium. The filtered beer is extracted with methylene chloride to remove the cycloheximide, which is recovered therefrom. The streptovitacin in the spent beer is further purified by adsorbing the streptovitacin from the spent beer on activated carbon, eluting the streptovitacin from the carbon with an aqueous solution of an organic solvent for streptovitacin, such as 85 percent acetone, and recovering from the carbon eluate the streptovitacin by the procedures described before for gradient chromatography, partition chromatography, crystallization, and recrystallization.

Streptovitacin is active against yeast, and yeast-like microorganisms such as *Saccharomyces pastorianus*, *Torula utilis*, *Saccharomyces cerevisiae*, *Pichia membranaefacieus*, and the like. From this activity are derived the *S. pastorianus* and the *P. membranaefaciens* assay methods, since the inhibition of such yeasts by streptovitacin is a reproducible straight line dose-response.

Streptovitacin is relatively inactive against most common bacteria. Streptovitacin is active against fungi such as *Puccinia rugibo-vera tritici*, the leaf rust of wheat.

Streptovitacin is active against protozoa such as *Trichomonas vaginalis*, *Entamoeba histolytica*, and the like. The reproducible inhibition of *T. vaginalis* corresponds to a straight line dose-response, and has proved useful in the *T. vaginalis* assay method.

Figure 2:
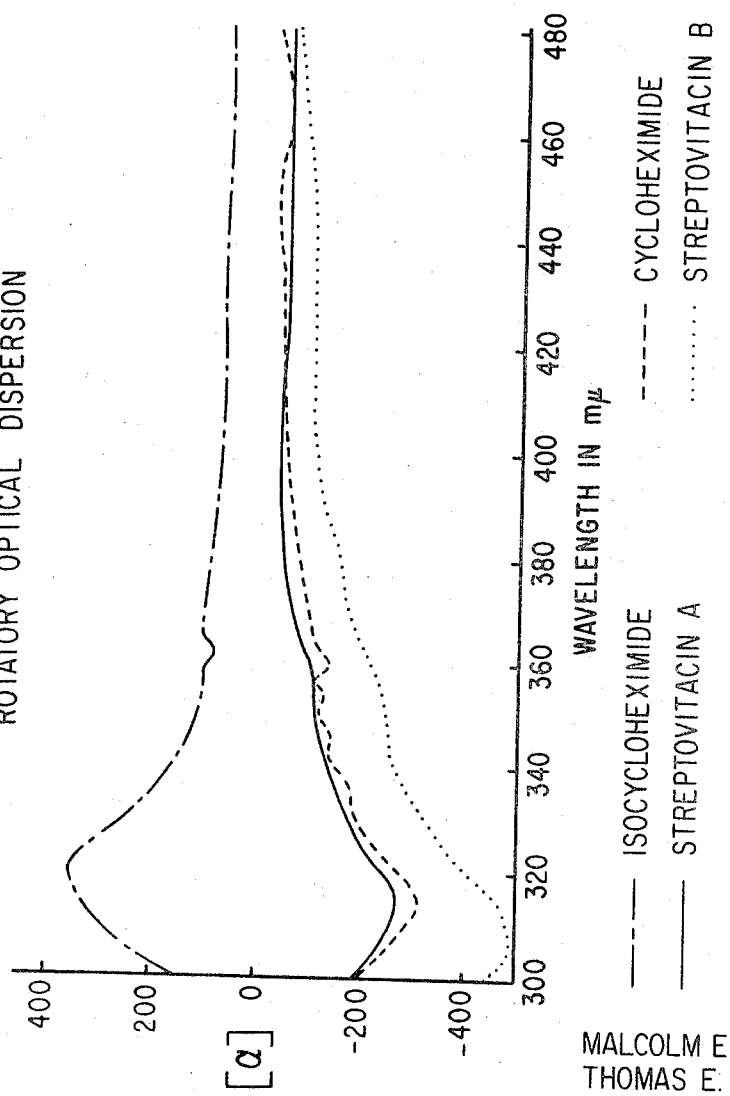
FIGURE 2 shows the rotatory dispersion curve of streptovitacins A and B as compared to cycloheximide and isocycloheximide.

Streptovitacin A is characterized by the Formula III, the infrared spectrum, FIGURE 1, the ultraviolet spectrum, FIGURE 3, and the rotatory dispersion curve, FIGURE 2. Streptovitacin A and streptovitacin B are characterized by the rotatory dispersion curves, FIGURE 2 and by their realtive mobility, as shown by paper strip partition chromatography shown in Table II, and in FIGURES 4 and 13.

Streptovitacin A and streptovitacin B are also characterized as the components separated and isolated by countercurrent distribution, FIGURE 5, wherein the solvent system is 1-phentanol: 3-methyl butanol:water in the volume proportions 1.7:1.2:2.9. The peaks, after 5260 transfers are as follows:

TABLE III

| Peak | Streptovitacin | K |
| --- | --- | --- |
| 1 | A | 0.3–0.32 |
| 2 | B | 0.36–0.38 |

Streptovitacin B is also characteriezd by Formula II, the infrared spectrum, FIGURE 6, the ultraviolet spectrum FIGURE 3, the rotatory dispersion curve FIGURE 2, and the paper strip mobility shown in Table II, and in FIGURES 4 and 13.

Streptovitacin $C_1$, is characterized by Formula I and by a paper strip mobility between streptovitacin B and streptovitacin $C_2$, i.e., an $R_c$, i.e., and $R_c$ of about 0.6 as shown in Table II, and FIGURES 4 and 13.

Streptovitacin $C_2$ is characterized by Formula I, the infrared spectrum, FIGURE 8, the ultraviolet spectrum, FIGURE 9, the rotatory dispersion curve, FIGURE 10, and the paper strip mobilities shown in Table II, and in FIGURES 4 and 13.

Streptovitacin D is characterized by Formula I, the infrared spectrum, FIGURE 11, the ultraviolet spectrum, FIGURE 12, the rotatory dispersion curve, FIGURE 10, and the paper strip mobilities shown in Table II, and FIGURES 4 and 13.

Streptovitacin E is characterized by Formula I and by a paper strip mobility between streptovitacin D and cycloheximide, i.e., and $R_c$ of about 0.93 as shown in Table II, and FIGURES 4 and 13.

The streptovitacin content of a material is determined by the WAC assay method which comprises treating groups of ten rats at each of three or four dosage levels against Walker's adenocarcinoma. The dosage level, as the abscissa, plotted against tumor inhibition, as the ordinate, on semilog scale results in a straight line. The standard material is equal to one WAC unit of streptovitacin per milligram. The inhibition is the control tumor size minus the tumor size of the treated animals divided by the control tumor size multiplied by 100. In assaying materials, groups of ten animals, each group is set at different drug levels and the present inhibition is read against the standard slope to determine the amount of WAC units of streptovitacin per milligram in the material assayed. One WAC unit is roughly equivalent to about two micrograms of streptovitacin A per milligram by the *S. pastorianus* assay. Pure streptovitacin A assay about 475 units per milligram.

Another assay procedure is the *Saccharomyces pastorianus* paper strip partition assay method performed in the following manner. Test and standard solutions are applied to 6.5 inches by 22.5 inches Schleicher and Schuell 589 filter paper strips (pretreated with 0.1 M, at pH four, potassium dihydrogen phosphate-phosphoric acid buffer) as spots of two, four, ten, and twenty microliters equilibrated with a solvent system comprising methanol:benzene:water, in the volume proportions 1:1:2, for sixteen hours; developed with the upper phase for 48 to 72 hours; dried; then equilibrated for sixteen hours with both phases of another solvent system comprising water:ethyl acetate, in the volume proportions 1:1, developed with the upper phase, water saturated ethyl acetate, for about six hours; and then dried. The test and standard solutions are spotted in a similar manner and developed in the same chamber at the same time. Eight-inch sections of each strip, of the areas containing streptovitacin, are cut out and plated on trays inoculated with *Saccharomyces pastorianus* in yeast assay agar. Yeast assay agar contains one percent glucose, 0.25 percent yeast extract, 0.1 percent mono-potassium phosphate, and 1.5 percent agar. The trays, with the strips left on the agar, are incubated at 37 degrees centigrade for fifteen to eighteen hours. The width of zones of inhibition are measured, and potency of test solutions are estimated from a standard curve plotted as zone width against the log of the dosage.

Streptovitacin, including streptovitacins A, B, $C_1$, $C_2$, D, and E, is a novel and useful biosynthetic material. It is (1) useful as as herbicide. It has been found active against foliage plants and can be used for controlling such noxious plants as crabgrass, pig weed, dandelion, broad and narrow leaf plantains, bind weed, wild mustard, chick weed, and the like. It is also toxic to lower plant life and is useful as an algicide for clearing ponds, brooks, lakes, and streams of undesirable growth of algae. (2) It is also useful as an antifungal agent, it being active in low dosages against *Puccinia rugibo-versa tritici*, the leaf rust of wheat. At the low dosages, at which streptovitacin is effective against the leaf rust of wheat, streptovitacin is not toxic against the wheat itself. Streptovitacin shows a stronger antifungal effect than 2,2 - dichloropropionic acid. It is also active against *Cryptococcus, Candida,* and *Saccharomyces*. Because of the activity of streptovitacin against yeasts, it is useful and valuable (3) in controlling secondary yeast fermentations in wines, and the like. Also it is useful (4) in a differential microbiological contamination assay, in cases where a few nonyeast microorganisms are found coordinantly with a large number of yeast microorganisms, as for example, in determining contaminations in fermentations in breweries, distilleries, and the like. It is useful, also, (5) in soil or other medium plate-outs as a differential screening medium wherein it is desirable and advantageous to have little or no yeast growth in the petri plates or broth. For this purpose it can be used along with the antibiotic amicetin wherein the suppression of growth of yeasts and bacteria is desirable. It is also useful (6) in producing giant cells in tissue culture; and (7) as a rodenticide (for both killing and repelling rodents), having the same order of toxicity to rodents as strychnine, a known rodenticide. It is also useful (8) as an intermediate for the preparation of 2,4-dimethyl-2-cyclohexenone (Beilstein 7I 50). (9) Streptovitacin has hypotensive activity, it lowers the blood pressure in hypertensive rats.

The invention can be more fully understood by reference to the following examples which are given by way of illustration only and are not to be construed as limiting.

All of the assay values reported in the examples and elsewhere in this application will be by the method previously described as the WAC assay method unless otherwise noted.

3A ethanol is a denatured mixture containing five gallons of absolute methanol in 100 gallons of 190 proof ethanol; that is, five percent methanol, five percent water, and ninety percent ethanol.

All percentages are by weight unless otherwise noted.

All solvent mixture proportions are as volume by volume unless otherwise noted.

*Example 1*

A spore suspension from a well sporulated culture of a cycloheximide producing strain of *Streptomyces griseus* was used to inoculate the following sterile medium:

| | |
|---|---|
| Glucose | g 10 |
| Beef extract | g 5 |
| Peptone | g 5 |
| Sodium chloride | g 5 |
| Tap water to make | l 1 |

This inoculated medium was then incubated on a reciprocal shaker for forty to 72 hours at 24 to 28 degrees centigrade and used to inoculate a seed tank which contained the following sterile medium:

| | |
|---|---|
| Glucose | 16 pounds 9 ounces |
| Brewer's yeast | 16 pounds |
| Distillers' solubles* | 8 pounds 5 ounces |
| Sodium chloride | 6 pounds 9 ounces |
| Calcium carbonate | 1 pound 11 ounces |
| Tap water to make | 200 gallons |

* Dried screened residue of yeast alcohol fermentation.

The seed tank was incubated at 25 degrees centigrated for 48 hours using eleven standard cubic feet per minute of free air. The seed medium was used to inoculate a fermentor containing the following sterile medium:

| | |
|---|---|
| Glucose | 2,000 pounds |
| Soybean meal | 500 pounds |
| Calcium carbonate | 250 pounds |
| Ammonium sulfate | 168 pounds |
| Sodium chloride | 125 pounds |
| Brewer's yeast | 84 pounds |
| Dihydrogen potassium phosphate | 6 pounds 9 ounces |
| Tap water | 3,850 gallons |

The fermentor was incubated at 25 degrees centigrade using 150 standard cubic feet per minute of free air. The fermentation was allowed to continue for five days. The principal antibiotic activity was cycloheximide, very little streptomycin being formed on fermentation at 25 degrees centigrade.

The whole beer was adjusted to pH 3.2 with sixty percent sulfuric acid and heated to sixty degrees centigrade for ten minutes. It was cooled to thirty degrees centigrade, and filtered with a filter aid. The filter cake was discarded. The filtered beer was extracted with 1000 gallons of methylene chloride in a Podbielniak extractor. The methylene chloride extract was reserved for recovery of cycloheximide and the remaining material was freeze dried to yield a solid (Preparation 1) which assayed one WAC unit of streptovitacin per milligram, or about 1.5 micrograms of streptovitacin per milligram by the *T. vaginalis* assay method, 0.8 microgram of streptovitacin A per milligram, and 0.6 microgram of streptovitacin B per milligram by the *S. pastorianus* paper partition assay method. Preparation 1 also assayed three micrograms of cycloheximide per milligram and 18.73 micrograms of streptomycin per milligram.

*Example 2*

A one-gram aliquot of the material prepared supra in Example 1, Preparation 1, was dissolved in ten milliliters of water, and 190 milliliters of acetone was added. A precipitate which formed was inactive, and was discarded. The supernatant was biologically active. This material was concentrated under reduced pressure to remove the acetone and then freeze dried to produce a product (Preparation 2) which assayed five WAC units of streptovitacin per milligram, or about eight micrograms of streptovitacin A per milligram, and about six micrograms of streptovitacin B per milligram by the *S. pastorianus* paper partition assay method.

*Example 3*

A one-gram aliquot of Preparation 2, as prepared in Example 2, was dissolved in twenty milliliters of water. Into the mixture was stirred one gram of activated carbon and the mixture stirred for one hour, after which time it was filtered, the filtrate being discarded. The carbon was eluted of streptovitacin with fifteen milliliters of 85 percent aqueous acetone. The acetone was mixed in with the carbon and after mixing, the mixture was filtered. The filtrate was evaporated under reduced pressure to remove the acetone and the remaining material was freeze dried to give a product (Preparation 3) which assayed fifteen WAC units of streptovitacin per milligram, about 21 micrograms of streptovitacin A per milligram, about twelve micrograms of streptovitacin B per milligram, and about 0.6 microgram of cycloheximide per milligram by the *S. pastorianus* paper partition assay, and which assayed no streptomycin.

*Example 4*

A 100-gram aliquot of Preparation 3, as obtained in Example 3, was dissolved in 300 milliliters of methyl alcohol, stirred for one-half hour, and filtered. The filtrate was concentrated under reduced pressure to 150 milliliters. The concentrate was added with stirring to 2800 milliliters of MEK. A precipitate was formed which was inactive and was discarded. The supernatant, which was active, was distilled azeotropically, with water added to replace the solvent, to an aqueous solution which was then freeze dried. This resulted in the material (Preparation 4) which assayed 35 WAC units of streptovitacin per milligram, or about 58 micrograms of streptovitacin A, and about 63 micrograms of streptovitacin B per milligram by the *S. pastorianus* paper partition assay method, 0.28 microgram of cycloheximide per milligram, and no streptomycin.

Example 5

A fermented beer, as prepared in Example 1, was adjusted to pH 3.3 with sixty percent sulfuric acid and heated to sixty degrees centigrade for twelve minutes. It was cooled to thirty degrees centigrade and filtered, using a filter aid, the filter cake being discarded. The filter beer was extracted with 1000 gallons of methylene chloride, the methylene chloride extract being reserved for recovery of cycloheximide, and the remaining material was contacted with activated carbon, using 1500 pounds of activated carbon. The activated carbon was then eluted with 85 percent aqueous acetone, and the eluate was concentrated to an aqueous solution by evaporating the acetone under reduced pressure and freeze dried.

An aliquot of 1210 grams of the solids supra was slurried with 3600 milliliters of methanol, and the insoluble material filtered off. The methanolic solution was concentrated under reduced pressure to 1800 milliliters and added to 35 liters of MEK, with stirring. A precipitate was formed which was filtered off and washed well with MEK. The filtrate was concentrated to an aqueous solution and freeze dried to give a product (Preparation 5a) assaying thirteen WAC units of streptovitacin per milligram, or about twenty micrograms of streptovitacin A per milligram, an aliquot of which was chromatographed as follows. A column three inches in diameter and two feet high was packed with three liters of Permutit DR resin. The resin was regenerated with a four percent sodium hydroxide (2.5 pounds sodium hydroxide per 28 liters of resin) solution and washed with deionized water to pH 8.0. The aqueous solution prepared by dissolving an 89-gram aliquot of Preparation 5a in 220 milliliters of water was poured into the top of the column and the column was washed with six liters of water. Then the column was gradiently eluted with aqueous ethanol (3A ethanol) ranging from zero percent ethanol to fifty percent ethanol (volume by volume). A total of 4500 milliliters of water and 4900 milliliters of fifty percent ethanol was used. The column was eluted starting with water and gradually increasing the percent of ethanol to fifty percent aqueous ethanol. The elution of the column was collected in fractions which were mixed into pools of the following amounts and assay:

TABLE IV

| Fraction No. | Pool No. | Total ml. | Total solids in g. | Assay WAC units per mg. |
|---|---|---|---|---|
| 1–9 | 1 | 2,200 | 3.9 (Prep. 5b) | 30 |
| 10–18 | 2 | 2,200 | 7.48 (Prep. 5c) | 150 |
| 19–24 | 3 | 1,500 | 7.35 (Prep. 5d) | 105 |
| 25–38 | 4 | 3,500 | 10.9 (Prep. 5e) | 10 |

Pools Nos. 2 and 3 were mixed and freeze dried yielding 14.83 grams of dry material (Preparation 5f) which assayed 130 WAC units of streptovitacin per milligram, 215 micrograms of streptovitacin A per milligram, and 175 micrograms of streptovitacin B by the *S. pastorianus* paper partition assay method, and no cycloheximide or streptomycin.

Example 6

A five-gram aliquot of purified streptovitacin, Preparation 5f of Example 5, as recovered from gradient chromatography, was dissolved in 25 milliliters of distilled water and then filtered. The filtered streptovitacin solution was extracted with fifty milliliters of MEK and then the mixture was treated with five grams of activated carbon. The carbon mixture was filtered and the carbon filter cake was washed with twenty milliliters of MEK. The MEK was removed by azeotropic distillation and the resulting aqueous solution concentrated under reduced pressures to an oily concentrate of purified streptovitacin (Preparation 6). The oily concentrate of purified streptovitacin, Preparation 6, assayed 240 WAC units of streptovitacin per milligram, and 300 micrograms of streptovitacin B per milligram by the *S. pastorianus* paper partition assay method. The oily concentrate was further purified by partition chromatography as in Example 8, or my countercurrent distributon as in Example 11.

Example 7

A five-gram aliquot of purified streptovitacin, preparation 5f, of Example 5, recovered from gradient chromatography, was dissolved in 25 milliliters of distilled water and then filtered. The filtered streptovitacin solution was extracted with 35 milliliters of chloroform and then with fifty milliliters of MEK; and the extracts were mixed and treated with five grams of activated carbon. The carbon mixture was filtered and the carbon filter cake was washed with twenty milliliters of MEK. The MEK and chloroform were removed by azeotropic distillation and replaced with butanol. The butanol solution of streptovitacin was concentrated under vacuum to a residue. The residue was taken up into butanol, fifty milliliters of butanol being used. The butanol solution was concentrated to about three milliliters and allowed to stand. Crystals of streptovitacin A were formed in this solution. There was recovered on drying the crystals in vacuo 158 milligrams of crystalline streptovitacin A. The crystalline streptovitacin A (Preparation 7a) had a melting point of 143–147 degrees centigrade and assayed 350 WAC units of streptovitacin per milligram, or about 580 microgram of streptovitacin A per milligram, and 500 micrograms of streptovitacin B per milligram by the *S. pastorianus* paper partition assay method. The mother liquor (Preparation 7b) was separated into streptovitacin B, C, and D by partition chromatography, as in Example 14.

Example 8

A three-gram aliquot of Preparation 5f, Example 5, was further purified by partition chromatography. A 150 grams aliquot of acid-washed diatomite was slurried with 500 milliliters of upper phase and sixty milliliters of lower phase, packed with five pounds air pressure into a 37½ inch column, one inch in diameter. The solvent system consisted of ethyl acetate:cyclohexane:3A ethal:water, in the volume proportions 8:6:8:4. The solvent mixture was made, and then allowed to separate into an upper and a lower phase. To the top of the column was added a slurry of three grams of Preparation 5f and four grams of diatomite in twenty milliliters of the upper phase and two milliliters of the lower phase, taking care not to disturb the top of the column. The column was eluted with upper phase. On elution, the following fractions and pools were recovered:

TABLE V

| Fraction | Pool | Total solids in mg. | Assay WAC units per mg. |
|---|---|---|---|
| 1–29 | 1 | Hold up, was discarded | |
| 30–45 | 2 | 171 (Prep. 8a) | 1 |
| 46–57 | 3 | 1,030 (Prep. 8b) | 300 |
| 58–63 | 4 | 229 (Prep. 8c) | 150 |

Pool No. 3 was freeze dried yielding product (Preparation 8b) which assayed 300 WAC units of streptovitacin per milligram, 360 micrograms of streptovitacin A per milligram, 340 micrograms of streptovitacin B per milligram by the *S. pastorianus* paper partition assay method.

Example 9

A 500-milligram aliquot of Preparation 8b, Example 8, was dissolved in ten milliliters of dry butanol, and cyclohexane was added until a milky cloud formed, ten milliliters being used. The solution was warmed gently to clear the cloud, and then the solution was allowed to cool. Crystals of streptovitacin formed and were dried in vacuo to yield 120 milligrams. The mother liquor (Preparation 9b) was separated into streptovitacin B, C, and D as described in Example 14. These crystals (Preparation 9a) melted at 145–147 degrees centigrade. The crystals were optically negative, monoclinic prisms, having an extremely small optic axial angle characteristic of form 11 crystals of streptovitacin A (see Example 10). They assayed 375 WAC units of streptovitacin per milligram, 750 micrograms of streptovitacin per milligram by the tissue culture assay method, 771 micrograms of streptovitacin per milligram by the *T. vaginalis* assay method, and 514 micrograms of streptovitacin A per milligram, and 317 micrograms of streptovitacin B per milligram by the *S. pastorianus* paper partition assay method.

Streptovitacin A has been shown by titration to have a weakly acidic amide group and by rotatory dispersion curves to be optically active. It gave a negative reaction in the following spot tests: Benedicts, Anthrone, Ninhydrin, Ehrlich-indole, Iodoform Biuret, Wegand, Morel-Chavassieu, Ekkert, ferric chloride, Bitto I, and Bitto II.

*Example 10*

A 1.5-gram aliquot of crystalline streptovitacin A, Preparation 9a of Example 9, was dissolved in twelve milliliters of 1-butanol by warming on a steam bath. The solution was treated with 0.5 gram of activated carbon and filtered while hot. The carbon filter cake was rinsed with hot 1-butanol and the combined filtrate was again treated with 0.3 gram of activated carbon and again filtered. This filtrate was concentrated to ten milliliters, under a stream of nitrogen, while on the steam bath. To the hot concentrated solution was added eleven milliliters of ethyl ether. Crystallization began and the mixture was cooled. The resulting crystals were collected by filtration and air dried to recover 1.0 gram (Preparation 10a). The crystals were then further recrystallized successively from (1) acetonitrile, (2) butanol-cyclohexane, (3) ethyl acetate, and (4) acetonitrile at room temperature. After drying in vacuo at seventy degrees centigrade, there was obtained 0.285 gram of pure crystalline streptovitacin A (Preparation 10b) which melted at 156–159 degrees centigrade and had the following (Form I) crystal characteristics:

Crystal system, orthorhombic
Crystal habit, tabular
Optic sign, negative
Optic axial angle, $2V=28°$
Refractive indices (5893 A.):
    $\alpha=1.500$
    $\beta=1.590$
    $\gamma=1.596$ This preparation assayed 450 WAC units of streptovitacin per milligram, 985 micrograms of streptovitacin A per milligram by *S. pastorianus* paper partition assay method, and 950 micrograms of streptovitacin per milligram by the *T. vaginalis* assay method, and had the following elemental analysis: Calculated for: $C_{15}H_{23}NO_5$: C, 60.58; H, 7.8; N, .71; O, 26.9. Found: C, 60.7; H, 8.04; N, 4.73; O, 27.0. The structural formula has been found to be:

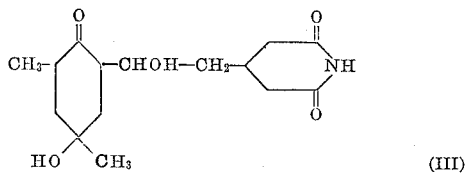

(III)

The crystalline streptovitacin A, Preparation 10b, so recovered was characterized chemically by the infrared absorption spectra, FIGURE 1; the rotatory dispersion curve, FIGURE 2; and the ultraviolet spectrum, FIGURE 3. The infrared spectrum, FIGURE 1, shows that streptovitacin A contains the following functional groups as assigned to the following frequencies listed in reciprocal centimeters:

| | |
|---|---|
| OH and/or NH | 3472, 3356, 3145 |
| Imide C=O | 1715 |
| H-Bonded keto C=O | 1682 |
| C—N | 1150, 1140 |
| Secondary alcohol C—O | 1030 |

The rotatory dispersion curve, FIGURE 2, shows that streptovitacin A is optically active and contains no conjugated dienes, conjugated aldehydes, or conjugated ketones.

On recrystallization from acetonitrile at four degrees centigrade, crystals of Form II having the following characteristics were obtained:

Crystal system, monoclinic, monoclinic angle=59°
Crystal habit, acicular
Optic sign, negative
Optic axial angle, $2V=16°$
Refractive indices (5893 A.):
    $\alpha=1.496$
    $\beta=1.593$
    $\gamma=1.596$ X-ray data, interplanar spacings, A. (Cu, $k_{\alpha 1}$):

| | | |
|---|---|---|
| 12.27 | 4.00 | 2.54 |
| 7.45 | 3.88 | 2.44 |
| 6.78 | 3.75 | 2.35 |
| 6.37 | 3.47 | 2.28 |
| 5.98 | 3.31 | 2.22 |
| 5.60 | 3.17 | 2.18 |
| 5.35 | 3.02 | 2.09 |
| 4.98 | 2.89 | 2.03 |
| 4.69 | 2.80 | 1.94 |
| 4.41 | 2.71 | 1.88 |
| 4.25 | 2.58 | |

*Example 11*

The oily concentrate of streptovitacin, Preparation 6 of Example 6, was further purified by countercurrent distribution. The solvent system used was 1-pentanol:3-methyl butanol: and water, of the volume proportions 1.7:1.2:2.9. An aliquot of 1.5 grams of Preparation 6 was loaded into the zero tube of a 1000-tube Craig counter-current distribution machine. By connecting the machine end to end, the material was allowed to pass through 5,260 transfers at which time two peaks were determined by solids analysis.

Streptovitacin A (Preparation 11a) crystallized (Form I) spontaneously from the pool of fractions of $K=0.3$ to 0.32, corresponding to the first peak. These crystals melted at 159–161 degrees centigrade.

Streptovitacin B (Preparation 11b) was obtained from an oily concentrate, from the pool of fractions of $K=0.36$ to 0.38, corresponding to the second peak, as described in FIGURE 5, which as freeze dried to an amorphous solid.

Streptovitacin B, Preparation 11b, assayed about 75 WAC units of streptovitacin per milligram, 120 micrograms per milligram by the *T. vaginalis* assay method, and 150 micrograms per milligram by the tissue culture assay method, and was assigned as 1000 micrograms of streptovitacin B per milligram in the *S. pastorianus* paper partition assay method. Streptovitacin B was also characterized by having an Rc, in respect to cycloheximide in water saturated ethyl acetate of about 0.5, whereas the Rc for streptovitacin A under those conditions was about 0.387. Under the same conditions, basing mobility on the total distance, also as in FIGURE 4, $R_f$ for streptovitacin B was 0.361 whereas $R_f$ for streptovitacin A was 0.277.

Streptovitacin B was as active against *S. pastorianus* as was streptovitacin A, and was about ½ to ⅒ as active as streptovitacin A against *T vaginalis*, in the tissue culture assay, and in the WAC assay.

The crystallization of steptovitacin B is disclosed infra, in Example 18.

*Example 12*

Streptovitacin A, B, C, D, and E can be separated, isolated and identified from any solution containing the same, such as a fermentation beer, crude, or concentrate, as for example in a beer by the following method of paper strip chromatography. Whole beer, as prepared as in Example 1, was applied to paper strips as 20 microliter aliquots, the paper strips having been impregnated with a 0.1 M. solution, at pH four, of a potassium dihydrogen phosphate-phosphoric acid buffer mixture. The strips spotted with the beer were developed for 72 hours with the upper phase of a solvent system which consists of methanol:benzene:water, of the volume proportions 2:1:1, dried and then equilibrated for sixteen hours with both phases of an ethyl acetate:water mixture, of the volume proportions 1:1, and then developed for six hours with the upper phase, i.e., water saturated ethyl acetate. The developed strips were dried and plated on *S. pastorianus* trays, and the trays were incubated at 37 degrees centigrade for fifteen to eighteen hours. The strips were removed from the plates and the widths of the zones were measured. Potencies wer estimated from standard curves plotted log dose against zone width. The R values were determined by measuring the distance (mobility) from the zone to the origin, in relation to the distance of the solvent front to the origin, and the $R_c$ values were determined in relation to the mobility of cycloheximide as follows:

Streptovitacin A, $R_f=0.38$, $R_c=0.413$
Streptovitacin B, $R_f=0.45$, $R_c=0.488$
Streptovitacin C, $R_f=0.57$, $R_c=0.619$
Streptovitacin D, $R_f=0.73$, $R_c=0.794$
Streptovitacin E, $R_f=0.85$, $R_c=0.924$
Cycloheximide, $R_f=0.92$, $R_c=1.0$ Now knowing the $R_f$ values for streptovitacin A and streptovitacin B more paper strips were spotted with fermentation beers, crudes, and concentrates of streptovitacin. After developing, the paper strips were cut at the appropriate parts so that there was one group which contained streptovitacin A, $R_f$ being equal to 0.25, another group of paper strips which contained streptovitacin B, wherein $R_f$ equals 0.38, and similarily for the other components C, D, and E. The streptovitacin A was eluted with 1-butanol and therefrom crystallized and recrystallized and recrystallized as in Examples 9 and 10 to form Preparation 12, crystal Form 1. Preparation 12 was similar to Preparation 11. Streptovitacin B was eluted from the papers containing it with MEK. The MEK was removed by distillation yielding an oily concentrate of streptovitacin B. The oily concentrate was freeze dried to yield an amorphous solid (Preparation 12b), streptovitacin B. Preparation 12b was similar to the streptovitacin B obtained in Example 11 as Preparation 11b. Streptovitacin C, D, and E are eluted from the portions containing them by ethyl acetate from which the components are recovered by freeze drying to form Preparations 12C, 12D, and 12E, respectively.

*Example 13*

A 2149-gram aliquot of purified streptovitacin, like Preparation 5f from gradient chromatography, was further purified by partition chromatography. A 210-pound aliquot of acetic acid washed diatomite was slurried with 85 gallons of upper phase and ten gallons of lower phase and packed with ten pounds air pressure into a thirteen-inch I.D. column eight feet high. The solvent system consisted of ethyl acetate:cyclohexane:3A ethanol:water in the volume proportions 8:6:8:4. The solvent mixture was made, and then allowed to separate into an upper and a lower phase. To the top of the column was added a slurry of the 2149 grams of streptovitacin and six pounds of diatomite in four gallons of upper phase and 0.5 gallon of lower phase. The column was eluted with upper phase, 350 gallons of upper phase being used for the elution. The fractions were ten-gallon aliquots. The following fractions and pools, as determined by solids concentration and assay value, were recovered:

TABLE VI

| Fraction | Material | Weight | Preparation | S. pastorianus assay as streptovitacin A, mcg./mg. |
|---|---|---|---|---|
| 1-12 | Discarded | Discarded | | No activity. |
| 13-17 | Streptovitacin A, E, and cycloheximide. | 85 grams— including 2.9 grams of crystalline streptovitacin A→ and mother liquor—→ | 13A 13B 13C | <100. |
| 18-26 | Streptovitacin A, B, D, and D. | 410 grams— including 52.9 grams of crystalline streptovitacin A —→ and mother liquor—→ | 13D 13E 13F | 520. |
| 27-34 | Streptovitacin A, B, C, and D. | 155 grams— including 124.3 grams of crystalline streptovitacin A —→ and mother liquor—→ | 13G 13H 13I | 450. |
| 35 | Discarded | Discarded | | No activity. |

*Example 14*

The mother liquors of Example 13, Preparations 13F, and 13I (in addition to Preparation 7B and 9B) were resolved into their parts by partition chromatography. An aliquot of twelve grams of the dried mother liquor, Preparation 13F, containing 281 micrograms of streptovitacin A per milligram and 400 micrograms of streptovitacin B per milligram was placed in a partition column, which contained 600 grams of diatomite and 240 milliliters of the lower phase of the solvent system ethyl acetate:cyclohexane: pH 5 buffered water, in the volume proportions 7:1:8. An aliquot of 600 grams of unwashed diatomite was slurried with enough of the upper phase to wet, 3000 milliliters being used. With agitation 240 milliliters of lower phase was added slowly. The mixture was poured into a two-inch inside diameter column and packed to a constant height of 53 inches using five pounds air pressure with the effluent valve wide open. The column was not allowed to run dry. An aliquot of twelve grams of dried mother liquor, Preparation 13F, Example 13, was dissolved in thirteen milliliters of lower phase, and mixed with 26 grams of diatomite and 75 milliliters of upper phase and gently poured onto the top of the column. The column was developed with the upper phase at the rate of six milliliters per minute. The elution of the column was collected in fractions of twenty milliliters each which were mixed into pools of the following amounts and assay:

TABLE VII

| Fraction | Preparation No. | Streptovitacin | Total Solids, mg. | Recovery |
|---|---|---|---|---|
| 1-147 | | None | | Discarded. |
| 148-168 | 14D | D | 294 | Dried. |
| 169-183 | | None | | Discarded. |
| 184-206 | 14C | C | 739 | Dried. |
| 207-213 | | None | | Discarded. |
| 214-280 | 14B | B | 3,490 | Dried. |
| 281-309 | | None | | Discarded. |
| 310-394 | 14A | A | 2,970 | Dried. |
| 395-502 | | None | | Discarded. |

*Example 15*

By a similar procedure as in Example 14, Preparation 13C of Example 13, was resolved into its components streptovitacin E and cycloheximide. In this instance the solvent system that was used was ethyl acetate:cyclohexane:water buffered to pH 5, in the volume proportions of 7:4:8. A nine-gram aliquot of Preparation 13C was dissolved in ten milliliters of lower phase and mixed with twenty grams of diatomite and fifty milliliters of upper phase. This was poured onto the top of the column. The column was developed with the upper phase at the rate of six milliliters per minute and collected in twenty-milliliter fractions. The elution of the column was collected in fractions which were mixed into pools of the following amounts and assay:

TABLE XIII

| Pool | Total Solids, mg. | Preparation No. |
|---|---|---|
| Streptovitacin E | 429 | 15a |
| Cycloheximide | 3,400 | 15b |

This procedure was also accomplished using the same solvent system in the volume proportions of 3:7:1.

Streptovitacin E, Preparation 15a, was further purified by Craig countercurrent distribution wherein the solvent used was ethyl acetate and aqueous pH 5 McIlvaine's buffer, in the volume proportions of 1:1. After 700 transfers the activity peak was found in tube 390 wherein $K=1.26$. This yielded, on concentration in vacuo, Preparation 15c 93 milligrams, of streptovitacin E having an $R_c$ as shown in Table II and in FIGURE 13.

*Example 16*

Streptovitacin was separated and isolated from cycloheximide and identified as such by paper strip chromatography as shown in FIGURE 7.

Two solvent systems (S-1), 81 percent 1-butanol and nineteen percent water, using Whatman No. 1 filter paper, and (S-5), methanol:benzene:water, in the volume proportions 1:1:2, using Schleicher and Schuell 589 filter paper, were used. Two test organisms were used, *T. vaginalis* and *S. pastorianus*.

*T. vaginalis papergram.*—Aliquots of twenty microliters of Preparation 4 were applied as spots to paper strips ¼ inch wide. For both solvent systems, the strips were equilibrated with both phases for sixteen hours, developed with the upper phase, and then dried. Each strip was cut into four-centimeter sections and each section was dropped into a tube containing ten milliliters of *T. vaginalis* seeded, sterile, thioglycollate broth medium. The tubes were incubated for 48 hours at 37 degrees centigrade. Trichomonal counts were made on each tube, a low count indicated activity. The control count, showing no activity was in the order of ninety cells per 0.1 microliter. A cell count in the order of 2-20 cells per 0.1 microliter was noted as demonstrating activity. The results are noted in FIGURE 7a (S-1) and 7b (S-5).

*S. pastorianus papergram.*—Aliquots of twenty microliters of Preparation 4 were applied as spots on sheets of paper six inches wide. For both solvent systems, the strips were developed as disclosed supra. The strips were applied on trays of yeast assay agar which had been seeded with *S. pastorianus*, as noted supra. The results are noted in FIGURE 7c (S-1) and 7d (S-5).

*Example 17*

Cycloheximide was recovered from the methylene chloride extract of Example 1. The methylene chloride extract was clarified in a centrifugal separator and decolorized with decolorizing carbon. It was then concentrated twenty to forty-fold and decolorized a second time with decolorizing carbon. The thus-decolorized methylene chloride extract was concentrated further to a solid content of about 400-500 grams per liter and then diluted with three liters of amyl acetate per kilogram of total solids and distilled in vacuo to remove the methylene chloride. The temperature was kept below about seventy degrees centigrade. The cycloheximide was then crystallized from the amyl acetate solution and the crystals washed with technical hexane. An aliquot of 100 milligrams of the cycloheximide thus obtained was dissolved in one milliliter of methanol. The solution was streaked across a six-inch wide Schleicher and Schuell 589 filter paper strip with a total of 110 microliters or about 0.11 milligram based on the cycloheximide sample. The strip was developed with the solvent system (S-5) methanol:benzene:water, in the volume proportions 2:1:1 by equilibrating with both phases for sixteen hours then developing with the upper phase.

As noted supra, in Example 16, streptovitacin did not move from the origin. The origin was cut off and eluted with three mililiters of methanol. The methanol was allowed to drip down the strip into a ten-milliliter beaker. The methanol was evaporated at room temperature in a hood with forced air to yield a minute amount of white material (Preparation 17) containing crystals of streptovitacin A and B which were observed to melt sharply at 144-148 and 119-122 degrees centigrade respectively.

*Example 18*

An aliquot of 7.0 grams of streptovitacin B of Example 14, Preparation 14b, was passed through 4510 transfers in a Craig counter current distribution machine using the solvent system ethyl acetate:water, in the volume proportions 1:1, as in Example 11. The peak fraction wherein $K=0.2$ was collected to yield 5.2 grams of freeze dried material (Preparation 18a). An aliquot of about ten milligrams of Preparation 18a was dissolved in 0.5 milli liters of ethyl acetate, placed in a test tube, and allowed to stand. After about a week the solvent had evaporated, and crystals of streptovitacin B (Preparation 18b) had formed in the residue.

An aliquot of 300 milligrams of streptovitacin B, Preparation 18a, was dissolved in three milliliters of 1-butanol and warmed on a steam bath. Cyclohexane was added until a cloud formed, three milliliters being used. The mixture was warmed until clear and then was seeded with a few seed crystals, Preparation 18b. As the mixture cooled it became milky, then a gummy white solid separated. The mixture was reheated, the gum was dissolved by the addition of a few drops, about 0.2 milliliter, of 1-butanol. A crystalline granular solid separated on standing at room temperature for several hours. The crystalline material was collected by filtration and air dried to form 220 milligrams of crude crystalline streptovitacin B (Preparation 18c). An aliquot of 150 milligrams of Preparation 18c was dissolved in 1.5 milliliters of acetonitrile, the mixture being warmed to facilitate solution. Dropwise ethyl ether was added to the mixture until a cloud formed, two milliliters being used, and seed crystals, Preparation 18b, were added. On standing overnight, crystals had formed which were collected by filtration and vacuum dried to yield 98 milligrams of purified crystalline streptovitacin B (Preparation 18d) which had a melting point of 124–128 degrees centigrade.

Crystalline streptovitacin B had the following elemental analysis: C, 60.66; H, 7.87; N, 7.41; O (by difference) 26.76, and is further characterized by the infrared spectrum, FIGURE 6, the ultraviolet spectrum, FIGURE 3, and the rotatory dispersion, FIGURE 2. The infrared spectrum, FIGURE 6, shows that streptovitacin B contains the following functional groups as assigned to the following frequencies listed in reciprocal centimeters:

OH and/or NH _____ 3560, 3460, 3150, 3050
Imide C=O _____ 1715
H-Bonded keto C=O .1697, 1677
C–N _____ 1150, 1130
Secondary Alcohol __ 1078, 1066, 1050, 1033, 1016, 1007

The rotatory dispersion curve, FIGURE 2, shows that streptovitacin B is optically active and contains no conjugated dienes, conjugated aldehydes, or conjugated ketones.

*Example 19*

(A) 21.36 grams of preparation 12c was partition chromatographed on a two inch column packed with diatomite, using the solvent system consisting of ethyl acetate, cyclohexane, McIlvaine's pH 5 buffer in the volume proportions 6:2:8. Twenty milliliter fractions were collected and analyzed by the determination of solids and by plating out dipped disks on trays seeded with *Saccharomyces pastorianus*. Two clearly separated activity peaks were obtained. Fractions 180–285, and fractions 310–355 were separately pooled and the two pools were evaporated to dryness under reduced pressures to yield, respectively, 13.3 grams of preparation 19a, streptovitacin $C_2$ and 1.79 grams of preparation 19b, streptovitacin $C_1$. Preparation 19b is characterized by the paper strip mobility shown in FIGURE 13.

(B) A ten gram aliquot of Preparation 19a, streptovitacin C, was chromatographed on a two inch diameter diatomite column. The solvent system consisted of ethyl acetate, cyclohexane, and McIlvaine's pH 5 buffer, in the volume proportions 4:4:8. Twenty milliliter fractions were collected and analyzed by the determination of solids and by plating out dipped disks on an agar tray seeded with *Saccharomyces pastorianus*. No solids or activity was detected through Fraction No. 400. After Fraction No. 470, the solvent system was changed to the volume proportions 5:3:8. A pool of Fractions No. 400 to 550 was evaporated to 1.85 grams of dry solids, which was then dissolved in 95 percent ethanol. The solvent was removed under reduced pressures leaving a crystalline residue, Preparation 19c which was then recrystallized twice from acetonitrile-ether to yield 600 milligrams of crystalline streptovitacin $C_2$, Preparation 14d. A 300 milligram portion of Preparation 19d was recrystallized again from acetonitrile-ether, ethyl acetate-ether, and twice from ethyl acetate. The resulting crystalline streptovitacin $C_2$ material, Preparation 19e weighed 149 milligrams, had a melting point of 91–96 degrees centigrade, and the following elemental analysis:

Calculated for $C_{15}H_{23}NO_5$: C, 60.58; H, 7.80; N, 4.71; O, 26.91. Found: C, 60.53; H, 7.98; N, 4.67; O, 26.82 (by difference).

It (Preparation 19e) is further characterized by the infrared spectrum, FIGURE 8, the ultraviolet spectrum, FIGURE 9, the rotatory dispersion curve, FIGURE 10, and the paper strip mobility shown in FIGURE 13. The infrared spectrum, FIGURE 8, shows that streptovitacin $C_2$ contains the following functional groups as assigned to the following frequencies listed in reciprocal centimeters:

OH and/or NH _____ 3580, 3400, 3320, 3180
C=O _____ 1712, 1680
C—H _____ 3060

The rotatory dispersion curve, FIGURE 10, shows that streptovitacin $C_2$ is optically active and contains no conjugated dienes, conjugated aldehyde, or conjugated ketone groups.

*Example 20*

A 12.8 gram aliquot of Preparation 14d was purified by countercurrent distribution for a total of 1900 transfers using the solvent system consisting of equal volumes of ethyl acetate and water. The distribution was analyzed by the determination of solids and by plating out dipped disks on a tray seeded with *Saccharomyces pastorianus*. A peak of activity between tubes 761 and 810 yielded 1.30 grams of crystalline streptovitacin D, Preparation 20a. The crystalline material was recrystallized four times from acetonitrile-ether to yield Preparation 20b which had a melting point of 67–69 degrees centigrade and the following elemental analysis:

Calculated for $C_{15}H_{23}NO_5$: C, 60.58; H, 7.80; N, 4.71; O, 26.91. Found: C, 60.42; H, 7.89; N, 4.83; O, 27.00 (direct).

It, Preparation 20b, is further characterized by the infrared absorption spectrum, FIGURE 11, the ultraviolet absorption spectrum, FIGURE 12, the rotatory dispersion curve, FIGURE 10, and the paper strip mobility shown in FIGURE 13. The infrared absorptions spectrum, FIGURE 12, shows that streptovitacin D contains the following functional groups as assigned to the following frequencies listed in reciprocal centimeters:

OH and/or NH _____3580, 3440, 3280, 3130
C=O _____1700, 1685
C—H _____3030, 2920, 2840, 1450, 1442
                          1385, 1372

The rotatory dispersion curve, FIGURE 10, shows that streptovitacin D is optically active and contains no conjugated diene, conjugated aldehyde, or conjugated ketone groups.

By tissue culture assay, streptovitacin A and D (Preparations 10b and 20b) have about equal activity; streptovitacin B (Preparation 18d) is about 1/20 as active as streptovitacins A and D; and streptovitacin C (Preparation 14d) is about 1/100 as active as streptovitacin B.

The particular strain of *Streptomyces griseus* used in the foregoing examples was that of U.S. Patents 2,449,866 and 2,612,502. This strain is known in the art as Waksman strain 4 (ATCC 10,137).

It is to be understood that the invention is not to be limited to the exact details of operation, exact compounds shown, or exact examples given and described herein, as obvious modifications and equivalents will be apparent to one skilled in the art, and the invention is therefore to be limited only by the scope of the appended claims.

We claim:
1. As a solid composition of matter 3-[2-(4-hydroxy-3,5 - dimethyl - 2 - oxocyclohexyl) - 2-hydroxyethyl]-glutarimide, having the structural formula:

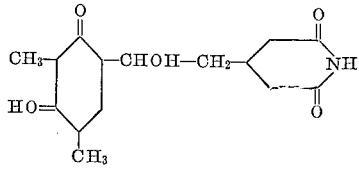

and being substantially free of cycloheximide.

2. A composition of matter consisting of 3-[2-(4-hydroxy - 3,5 - dimethyl-2-oxocyclohexyl)-2-hydroxyethyl]-glutarimide, having the structural Formula II.

3. Crystalline 3 - [2 - (4-hydroxy-3,5-dimethyl-2-oxocyclohexyl) - 2 - hydroxyethyl] - glutarimide, having the structural Formula II.

4. A solid substance, streptovitacin $C_1$, having the Formula I

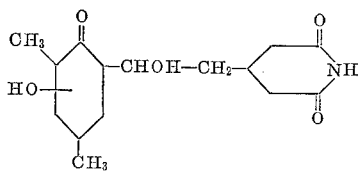

and having a paper strip mobility in water-saturated ethyl acetate falling between those of streptovitacin B and streptovitacin $C_2$, and by being substantially free of cycloheximide.

5. A solid substance, streptovitacin $C_2$, characterized by the structural Formula I; by a paper strip mobility in water-saturated ethyl acetate of about 70 percent that of cycloheximide; and being substantially free of cycloheximide.

6. A composition of matter consisting of streptovitacin $C_2$ having the structural Formula I and in its essentially pure form being characterized by a paper strip mobility in water-saturated ethyl acetate of about 70 percent that of cycloheximide.

7. A solid substance, streptovitacin D, characterized by the structural Formula I; by an IR absorption spectrum as shown in FIGURE 11; by a paper strip mobility in water-saturated ethyl acetate of about 80 percent that of cycloheximide; and by being substantially free of cycloheximide.

8. A composition of matter consisting of streptovitacin D having the structural Formula I and in its essentially pure form being characterized by an IR absorption spectrum as shown in FIGURE 11; by a paper strip mobility in water-saturated ethyl acetate of about 80 percent that of cycloheximide.

9. A solid substance, streptovitacin E, characterized by the structural Formula I; by a paper strip mobility in water-saturated ethyl acetate falling between those of streptovitacin D and cycloheximide, and by being substantially free of cycloheximide.

10. A process for the recovery of streptovitacin, a compound having the structural Formula I, from the beer produced in a cycloheximide fermentation which comprises filtering the whole beer, extracting the cycloheximide from the filtered beer with a water-immiscible solvent for cycloheximide and then recovering streptovitacin from the spent beer.

11. The process of claim 10 wherein the streptovitacin is recovered by adsorption on a surface active adsorbent and eluted therefrom with a neutral solvent for streptovitacin.

12. The process of claim 11 in which the solvent for streptovitacin is selected from the group consisting of lower alkanols and lower alkanones.

13. The process of claim 11 in which the adsorbent is selected from the group consisting of active carbon, inorganic adsorbent gels, and porous adsorbent resins.

14. The process of claim 11 in which the solvent is selected from the group consisting of lower alkanols and lower alkanones.

15. A process for upgrading streptovitacin, a compound having the structural Formula I, which comprises subjecting crude streptovitacin to partition chromatography using a solvent system consisting of fifteen to fifty percent water at pH four to seven, fifteen to fifty percent water-immiscible organic solvent, and up to 35 percent water-miscible organic solvent; said system consisting of from 40 to 75 percent polar organic solvent selected from the group consisting of lower saturated aliphatic alcohols, lower saturated aliphatic ketones, and lower saturated aliphatic carboxylic acid esters; up to 25 percent saturated hydrocarbon solvent; and the balance water.

16. The process of claim 15 wherein the solvent system for the partition column is ethyl acetate:cyclohexane:3A ethanol:water, in the volume proportions 8:6:8:4.

17. The process of claim 15 wherein the solvent system for the partition column is ethyl acetate:cyclohexane:pH 5 buffered water, in the volume proportions 7:1:8.

18. A process for the isolation of streptovitacin, a compound having the structural Formula I from the beer produced in a cycloheximide fermentation which comprises filtering the whole beer, removing the cycloheximide by solvent extraction, recovering streptovitacin complex from the spent beer, and isolating at least one of the streptovitacin compounds of said complex.

References Cited by the Examiner

UNITED STATES PATENTS 2,612,502  9/1952  Leach _____ 260—281
3,214,431  10/1965  Rao et al. _____ 260—281

ALEX MAZEL, *Primary Examiner.*

DONALD G. DAUS, *Assistant Examiner.*